Oct. 4, 1966  E. M. LAMBERT  3,276,805
WEED PULLER
Filed Aug. 17, 1964
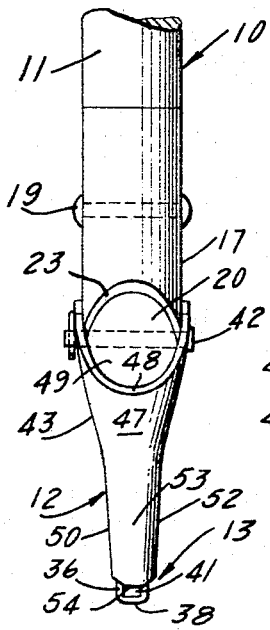
Fig. 1.
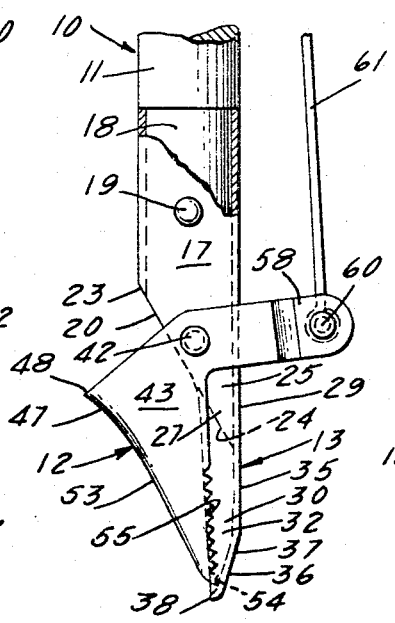
Fig. 2.
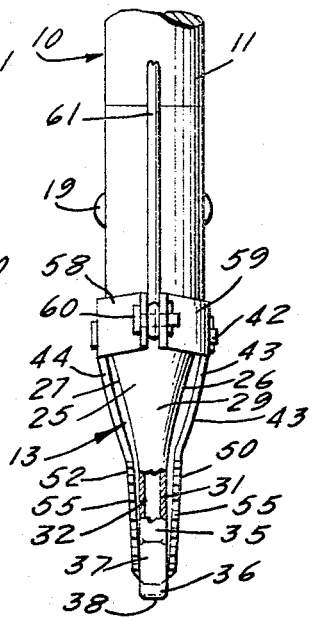
Fig. 3.
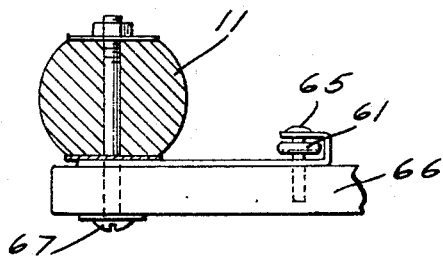
Fig. 4.
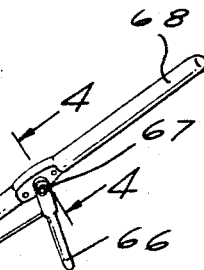
Fig. 5.
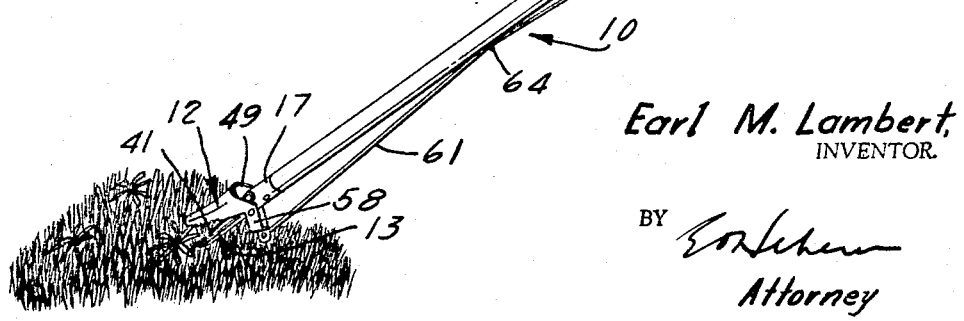
Earl M. Lambert,
INVENTOR.
BY
Attorney

United States Patent Office 3,276,805
Patented Oct. 4, 1966

3,276,805
WEED PULLER
Earl M. Lambert, 10808 W. Victory Blvd.,
North Hollywood, Calif.
Filed Aug. 17, 1964, Ser. No. 389,908
7 Claims. (Cl. 294—19)

This invention relates to a weed puller and, more particularly, to a weed puller having a positive gripping action and which the operator uses in a standing position.

In the prior art, weed pullers have been generally unsatisfactory in that they have not had a positive gripping action and they generally must be used with the operator in a sitting or kneeling position. The present invention overcomes these disadvantages in that it positively grips any weed, the operator being in the standing position. In the operation of the present invention it has been surprisingly found that a tremendous gripping action may be applied to a weed and this gripping action is not only applied to the above surface part of the weed but to the root, so that the entire root can be removed along with the above surface portion of the weed.

It is an object of the present invention to provide an improved weed puller.

It is another object of the present invention to provide a weed puller which can be used by an operator in a standing position.

It is still another object of the present invention to provide a weed puller which has a positive gripping action, not only on the above surface portion of the weed but also on the root portion of the weed, so that the entire growth can be removed.

It is a further object of the present invention to provide a weed puller in which the moving parts will not foul. That is, there is provided the freedom of action in the weed pulling parts so that a number of small weeds can be pulled and retained in the puller without any fouling of the moving parts.

Further objects and advantages of the invention may be brought out in the following part of the specification wherein small details have been described for the competence of disclosure, without intending to limit the scope of the invention which is set forth in the appended claims.

Referring to the accompanying drawings, which are for illustrative purposes:

FIG. 1 is a fragmentary plan view showing the upper top view of the weed puller according to the invention;

FIG. 2 is a fragmentary, side elevational view of the weed puller shown in FIG. 1, illustrating the jaws in closed position;

FIG. 3 is a fragmentary lower plan view, taken from the right of FIG. 2;

FIG. 4 is a fragmentary view illustrating a portion of the actuating means, taken as indicated by the line 4—4 in FIG. 5; and FIG. 5 is a perspective view of the weed puller according to the invention in operating position.

Referring again to the drawings, there is shown a weed puller 10, having a handle 11, an upper jaw 12 and a lower jaw 13. The lower or fixed jaw 13 is secured to the handle 11 by means of a sleeve extension 17. The sleeve 17 is fitted on a reduced diameter portion 18 of the handle and is secured thereto by a rivet 19. The handle, which may be of wood, is cut off at an angle at 20 to conform to the sleeve surface 23, and so as to terminate at a point 24 within the jaw 13.

The jaw 13 extends longitudinally outwardly from the sleeve 17 in a generally U-shaped portion 25 having tapered walls 26 and 27 and a relatively flat base 29. Outwardly from the portion 25 extends a narrowed channel-shaped portion 30 having a generally parallel transversely spaced walls 31 and 32 and a base 35. The jaw 13 has an end portion 36, having a base 37 tapering to a point or end 38. The spaced walls 31 and 32 continue to the end 38 but have less depth as they approach it. Thus, the portions 25, 30 and 36 of the jaw 13 form a weed receiving cup having an opening 41 facing the jaw 12, the jaw 13 extending longitudinally or axially, with respect to the handle, beyond the jaw 12 as indicated at the end 38.

The upper jaw 12 is pivotally secured to the handle 11 and to the sleeve 17 by means of a clevis pin 42 so that as the jaw 12 pivots on the pin 42, it opens and closes on the jaw 13.

In plan view, as shown in FIGS. 1 and 3, the jaw 12 has a configuration similar to that of jaw 13 so that they are mating members. Extending axially and radially from a position adjacent pivot 42, on jaw 12, are tapering transversely spaced walls 43 and 44. The walls 43 and 44 join a base portion 47 which commences axially outwardly of the pivot pin 42, when the jaws are closed, as may be best seen in FIGS. 1 and 2. That is, when the jaws are closed the base or its inner end 48, does not extend radially outwardly of the handle or pivot 42 in a plane perpendicular to the axis of the handle. This provides an opening 49, as shown in FIGS. 1 and 5, which may receive a plurality of small weeds as they are pulled and forced upwardly between the jaws.

Extending axially outwardly from the walls 43 and 44 are relatively closely spaced walls 50 and 52, the latter walls terminating radially outwardly in a relatively flat base 53 to form the channel-shaped cup portion. At the outer axial end the base 53 is an inwardly directed weed-locking tab 54, and which as best seen in FIG. 2, extends into the jaw 13 when the jaws are closed. The walls 50 and 52, axially inwardly of the tab 54 have a plurality of teeth, directed toward the jaw 13, to grip the weed as the jaws close on it. The jaw 12 is generally wider than the jaw 13 so that its walls overlap the walls of the latter jaw when they are closed, and the teeth 55 also extend over the jaw 13 in the closed position. As shown in FIG. 3, there is substantial clearance between the two sets of walls in the respective jaws.

Extending to the right in FIG. 2, from the walls 43 and 44 are two lever arms 58 and 59, formed as a yoke, and are pivotally engaged at pivot 60 with an actuating rod 61. The rod 61 extends upwardly along the handle for upwardly and downwardly reciprocal movement and is held in close slidable arrangement with the handle by means of a loop member 64, as shown in FIG. 5.

As best seen in FIG. 4, at its upper end, the rod 61 is pivotally engaged by a pivot 65 intermediate the ends of an actuating lever 66. The outer end of the lever 66 extends away from the handle 11 and its inner end is pivoted to the handle at pivot 67. The lever arms 58 and 59 are about the same length as the distance between the pivots 65 and 67 on the actuating lever 66. Longitudinally above the lever 66 is the gripping end 68 of the handle.

In operation, with the jaws open, the handle end 68 is held by one hand of the operator and the lower end 38 of the jaw 13 is inserted into the soil along the root of a weed, holding the weed-puller 10 at an acute angle with the ground and so that the rod 61 extends laterally of the handle with respect to the operator, that is, not toward or away from the operator. When the end 38 is alongside the weed in the ground, the open jaw 12 is then closed by moving the actuating lever 68 upwardly where it is so held until the weed is pulled by lifting the upper end 68 to clear the end 38 from the ground.

When small weeds are being pulled, they are held in one of the jaws or in both of them, even though the jaws are opened, and as a plurality of weeds are pulled they are forced upwardly into the cup formed by the jaw 12 and into the enlarged portion surrounding the opening 49. Here, the weeds are held until it is necessary to remove them because of an excess number. Because of the specific arrangement of the opening 49, there is freedom of action of the movement of the jaw 12, with respect to the jaw 13, even though there are a few small weeds retained in it. When pulling small weeds, after each one is pulled, the jaws are not opened widely, so that the weeds may be retained between them.

In pulling both large and small weeds, the lower jaw acts as a cup receiving and compressing the weeds and the tab 54 at the end of the upper jaw 12 locks the weed in the lower jaw, irrespective of whether the jaws close all the way or not. The jaws, of course, will close all the way if the weed is small, but not if the weed is large. As the upper jaw is moved so as to completely close on it, the teeth 55 grip and compress the weed over the lower jaw. The overlapping effect of the teeth and the walls of the upper jaw with respect to the lower jaw is substantially the same whether or not the jaws are closed all the way or whether they are closed only partially. That is, they grip the weed on the lower jaw in either case.

While the lever arms operating the upper jaw are relatively short, the gripping effect upon a weed is surprising, due to the construction of the jaws, and the toughest weed and its root is easily withdrawn from the ground once the weed and root have been gripped.

The invention and its attendant advantages will be understood from the foregoing description and it will be apparent that various changes may be made in the form, construction and arrangement of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims, wherein various portions have been separated for clarity of reading and not for emphasis.

I claim:
1. In a weed puller:
   (a) a handle;
   (b) a first elongated jaw fixed to said handle and extending from one end thereof;
   (c) a second elongated jaw pivotally connected to said handle and adapted to pivot to opened and closed positions with respect to said first jaw;
   (d) means associated with said handle to pivot said second jaw to said opened and closed positions,
   (e) said first jaw having its outer end extending longitudinally beyond the outer end of said second jaw when they are closed,
   (f) said first jaw having transversely spaced walls having an opening therebetween facing said second jaw;
   (g) a weed locking tab on said outer end of said second jaw extending between said spaced walls on said first jaw when said jaws are closed;
   (h) a first generally channel-shaped portion extending longitudinally from said outer end of said second jaw and having an opening facing toward said first jaw,
   (i) said first portion having side walls externally overlapping said first jaw when said jaws are closed; and
   (j) a second generally channel-shaped portion extending longitudinally inwardly from said first portion and terminating adjacent said pivotal connection to said handle,
   (k) said second portion having a greater depth and a wider base between its side walls than said first portion; and when said jaws are closed, the longitudinally inner end of said base of said second portion is longitudinally outwardly of said pivotal connection.

2. In a weed puller:
   (a) a handle;
   (b) a first elongated jaw fixed to said handle and extending from one end thereof;
   (c) a second elongated jaw pivotally connected to said handle and adapted to pivot to opened and closed positions with respect to said first jaw;
   (d) means associated with said handle to pivot said second jaw to said opened and closed position,
   (e) said first jaw having its outer end extending longitudinally beyond the outer end of said second jaw when they are closed,
   (f) said first jaw having transversely spaced walls having an opening therebetween facing said second jaw and said spaced walls terminating at the outer end of said first jaw in a transverse end wall;
   (g) a weed locking tab on said outer end of said second jaw extending between said spaced walls on said first jaw when said jaws are closed;
   (h) a first generally channel-shaped portion extending longitudinally from said outer end of said second jaw and having an opening facing toward said first jaw,
   (i) said first portion having side walls externally overlapping said first jaw when said jaws are closed; and
   (j) a second generally channel-shaped portion extending longitudinally inwardly from said first portion and terminating adjacent said pivotal connection to said handle,
   (k) said second portion having a greater depth and a wider base between its side walls than said first portion; and when said jaws are closed, the longitudinally inner end of said base of said second portion is longitudinally outwardly of said pivotal connection,
   (l) said walls of said first portion having teeth directed toward and overlapping said first jaw when said jaws are closed.

3. The invention according to claim 2, in which said means associated with said handle are comprised of lever-arm means on said second jaw pivotally connected to one end of a rod slidable on said handle, the other end of said rod being pivotally connected to an actuating lever, said actuating lever being pivotally connected to said handle so that pivotal movement of said actuating lever opens and closes said jaws.

4. The invention according to claim 2, in which said inner end of said second portion is open toward said handle.

5. In a weed puller:
   (a) a handle;
   (b) a first elongated jaw fixed to said handle and extending from one end thereof;
   (c) a second elongated jaw pivotally connected to said handle and adapted to pivot to opened and closed positions with said first jaw;
   (d) means associated with said handle to pivot said second jaw to said opened and closed positions;
   (e) said first jaw having its outer end extending longitudinally beyond the outer end of said second jaw when they are closed;
   (f) a weed-locking tab on said outer end of said second jaw extending toward said first jaw;
   (g) a first generally channel-shaped portion extending longitudinally from said outer end of said second jaw and having an opening extending facing toward said first jaw,
   (h) said first portion having side walls externally overlapping said first jaw when said jaws are closed; and
   (i) a second generally channel-shaped portion extending longitudinally inwardly from said first portion and terminating adjacent said pivotal connection to said handle,
   (j) said second portion having a greater depth and a wide base between its side walls than said first portion, and when said jaws are closed the longitudinally inner end of said base of said second portion being longitudinally outwardly of said pivotal connection,
   (k) said walls of said first portion having teeth directed toward and overlapping said first jaw when said jaws are closed.

6. In a weed puller:
   (a) a handle;
   (b) a first elongated jaw fixed to said handle and extending from one end thereof;
   (c) a second elongated jaw pivotally connected to said handle and adapted to pivot to opened and closed positions with respect to said first jaw;
   (d) means associated with said handle to pivot said second jaw to said opened and closed positions,
   (e) said first jaw having its outer end extending longitudinally beyond the outer end of said second jaw when they are closed,
   (f) said first jaw having transversely spaced walls having an opening therebetween facing said second jaw;
   (g) a weed locking tab on said outer end of said second jaw extending between said spaced walls on said first jaw when said jaws are closed;
   (h) a first generally channel-shaped portion extending longitudinally from said outer end of said second jaw and having an opening facing toward said first jaw,
   (i) said first portion having side walls externally overlapping said first jaw when said jaws are closed; and
   (j) a second generally channel-shaped portion extending longitudinally inwardly from said first portion and terminating adjacent said pivotal connection to said handle,
   (k) said second portion having a greater depth and a wider base between its side walls than said first portion.

7. In a weed puller:
   (a) a handle;
   (b) a first elongated jaw fixed to said handle and extending from one end thereof;
   (c) a second elongated jaw pivotally connected to said handle and adapted to pivot to opened and closed positions with respect to said first jaw;
   (d) means associated with said handle to pivot said second jaw to said opened and closed positions,
   (e) said first jaw having its outer end extending longitudinally beyond the outer end of said second jaw when they are closed,
   (f) said first jaw having transversely spaced walls having an opening therebetween facing said second jaw;
   (g) a weed locking tab on said outer end of said second jaw extending toward said first jaw;
   (h) a first generally channel-shaped portion extending longitudinally from said outer end of said second jaw and having an opening facing toward said first jaw,
   (i) said first portion having side walls externally overlapping said first jaw when said jaws are closed; and
   (j) a second generally channel-shaped portion extending longitudinally inwardly from said first portion and terminating adjacent said pivotal connection to said handle,
   (k) said second portion having a greater depth and a wider base between its side walls than said first portion.

References Cited by the Examiner
UNITED STATES PATENTS

| | | | |
|---|---|---|---|
| 694,088 | 2/1902 | Bowman | 294—50.9 |
| 1,576,798 | 3/1926 | Spiegel | 294—50.9 |
| 1,752,467 | 4/1930 | Strawn | 294—50.9 |

GERALD M. FORLENZA, *Primary Examiner.*

G. F. ABRAHAM, *Assistant Examiner.*